(12) United States Patent
Komoda

(10) Patent No.: US 12,724,497 B2
(45) Date of Patent: Sep. 1, 2026

(54) DEVICE, INFORMATION PROCESSING METHOD AND PROGRAM

(71) Applicant: JINS HOLDINGS Inc., Gunma (JP)

(72) Inventor: Taiki Komoda, Gunma (JP)

(73) Assignee: JINS HOLDINGS Inc., Gunma (JP)

(*) Notice: Subject to any disclaimer, the term of this patent is extended or adjusted under 35 U.S.C. 154(b) by 0 days.

(21) Appl. No.: 19/233,576

(22) Filed: Jun. 10, 2025

(65) Prior Publication Data

US 2026/0010243 A1 Jan. 8, 2026

(30) Foreign Application Priority Data

Jun. 11, 2024 (JP) ................................ 2024-094256

(51) Int. Cl.
*G06F 3/0346* (2013.01)
*G02B 27/01* (2006.01)
*G06F 3/01* (2006.01)

(52) U.S. Cl.
CPC ....... *G06F 3/0346* (2013.01); *G02B 27/0172* (2013.01); *G06F 3/012* (2013.01); *G02B 2027/0178* (2013.01)

(58) Field of Classification Search
CPC .................. G06F 3/0346; G06F 3/012; G02B 2027/0178; G02B 27/0172
See application file for complete search history.

(56) References Cited

U.S. PATENT DOCUMENTS 10,261,581 B2 * 4/2019 Kim ........................ G06F 3/013
10,802,600 B1 * 10/2020 Ravasz .................. G06F 3/013
2012/0200497 A1 * 8/2012 Nasiri .................... G06F 3/017 345/157
2014/0092011 A1 * 4/2014 De Foras ............... G06F 3/017 345/157
2015/0029095 A1 * 1/2015 Gomez .............. G06F 3/04883 345/156
2022/0035448 A1 2/2022 Komoda
2022/0197405 A1 * 6/2022 Tian ...................... G06F 1/1694
2025/0271941 A1 * 8/2025 Govindu ................ G06F 3/017

FOREIGN PATENT DOCUMENTS

JP H04-309996 A 11/1992
JP H09-258887 A 10/1997
JP 2001-265498 A 9/2001
JP 2022-026251 A 2/2022
JP 2023-179927 A 12/2023
JP 7406038 B 12/2023

* cited by examiner

*Primary Examiner* — Ariel A Balaoing
(74) *Attorney, Agent, or Firm* — Sterne, Kessler, Goldstein & Fox P.L.L.C.

(57) ABSTRACT

An eyewear device has a processor that acquires motion information corresponding to a predetermined body part of a user from a sensor mounted on the body part. A pointer is displayed on a display screen, based on an operation mode, which is set to one of (1) a moving mode in which a moving signal relating to moving, over the display screen, the pointer displayed on the display screen is transmittable to an operation target device, based on the motion information, (2) a restricting mode in which movement of the pointer on the display screen is restricted, and (3) a pressing mode in which a pressing signal relating to executing a pressing operation at a position of the pointer on the display screen is transmittable to the operation target device, based on the motion information.

12 Claims, 12 Drawing Sheets

| TIMING | MOTION INFORMATION | MOTION OF HAND | OPERATION MODE | INFORMATION TO BE SENT |
|---|---|---|---|---|
| T_000 | D_000 | — | RESTRICTING MODE | NONE OR MOVING DISTANCE (0, 0) |
| ⋮ | ⋮ | | | |
| T_100 | D_100 | | | |
| T_105 | D_105 | NOD (THIRD CONDITION SATISFIED) | | |
| ⋮ | ⋮ | | | |
| T_150 | D_150 | | | |
| T_155 | D_155 | MOVE | MOVING MODE | MOVING SIGNAL |
| ⋮ | ⋮ | | | |
| T_250 | D_250 | | | |
| T_255 | D_255 | STOP (SECOND CONDITION SATISFIED) | | NONE OR MOVING DISTANCE (0, 0) |
| ⋮ | ⋮ | | | |
| T_350 | D_350 | | | |
| T_355 | D_355 | NOD LOOK DOWN | PRESSING MODE | PRESSING SIGNAL |
| ⋮ | ⋮ | | | |
| T_400 | D_400 | | | |
| T_405 | D_405 | FACE FRONT (FIRST CONDITION SATISFIED) | | NONE OR MOVING DISTANCE (0, 0) |
| ⋮ | ⋮ | | | |
| T_450 | D_450 | | | |
| T_455 | D_455 | MOVE | MOVING MODE | MOVING SIGNAL |
| ⋮ | ⋮ | | | |
| T_500 | D_500 | | | |
| ⋮ | ⋮ | ⋮ | ⋮ | |

Fig. 2

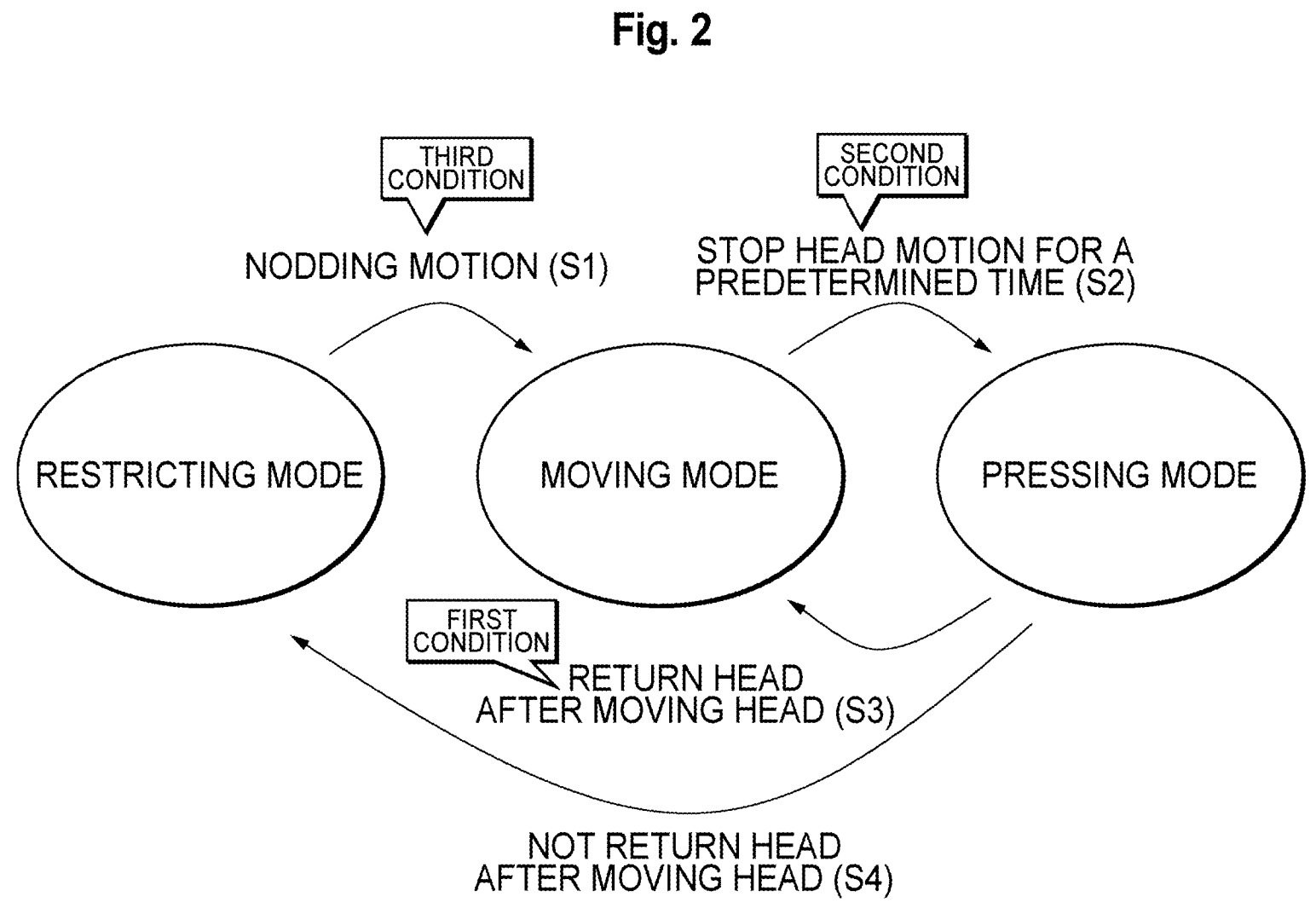

RESTRICTING MODE

MOVING MODE

PRESSING MODE

THIRD CONDITION

NODDING MOTION (S1)

SECOND CONDITION

STOP HEAD MOTION FOR A PREDETERMINED TIME (S2)

FIRST CONDITION

RETURN HEAD AFTER MOVING HEAD (S3)

NOT RETURN HEAD AFTER MOVING HEAD (S4)

3
110
CPU
112
ACQUIRING UNIT
113
PROCESSING CONTROL UNIT
170
130
MEMORY
160
IMAGING SENSOR
150
USER INTERFACE
151
DISPLAY
152
INPUT DEVICE
120
COMMUNICATION INTERFACE
122
FEEDING INTERFACE 200
202
204
206
208
210
212
PROCESSING UNIT
ACQUIRING UNIT
MODE CONTROL UNIT
DETERMINING UNIT
OUTPUT UNIT
COMMUNICATION INTERFACE
FEEDING INTERFACE
DISPLAY UNIT
6-AXIS SENSOR
22
220
230

Fig. 5

| TIMING | MOTION INFORMATION | ⋮ |
|---|---|---|
| T_1 | D_1 | ⋮ |
| T_2 | D_2 | ⋮ |
| T_3 | D_3 | ⋮ |
| ⋮ | ⋮ | ⋮ |
| T_30 | D_30 | ⋮ |
| ⋮ | ⋮ | ⋮ |
| T_59 | D_59 | ⋮ |
| T_60 | D_60 | ⋮ |
| ⋮ | ⋮ | ⋮ |

Fig. 6

| TIMING | MOTION INFORMATION | MOTION OF HAND | OPERATION MODE | INFORMATION TO BE SENT |
|---|---|---|---|---|
| T_000 | D_000 | — | RESTRICTING MODE | NONE OR MOVING DISTANCE (0, 0) |
| ⋮ | ⋮ | | | |
| T_100 | D_100 | | | |
| T_105 | D_105 | NOD | | |
| ⋮ | ⋮ | | | |
| T_150 | D_150 | | THIRD CONDITION SATISFIED | |
| T_155 | D_155 | MOVE | MOVING MODE | MOVING SIGNAL |
| ⋮ | ⋮ | | | |
| T_250 | D_250 | | | |
| T_255 | D_255 | STOP | | NONE OR MOVING DISTANCE (0, 0) |
| ⋮ | ⋮ | | | |
| T_350 | D_350 | | SECOND CONDITION SATISFIED | |
| T_355 | D_355 | NOD LOOK DOWN | PRESSING MODE | PRESSING SIGNAL |
| ⋮ | ⋮ | | | |
| T_400 | D_400 | | | |
| T_405 | D_405 | FACE FRONT | | NONE OR MOVING DISTANCE (0, 0) |
| ⋮ | ⋮ | | | |
| T_450 | D_450 | | FIRST CONDITION SATISFIED | |
| T_455 | D_455 | MOVE | MOVING MODE | MOVING SIGNAL |
| ⋮ | ⋮ | | | |
| T_500 | D_500 | | | |
| ⋮ | ⋮ | ⋮ | ⋮ | |

Fig. 7

| TIMING | MOTION INFORMATION | MOTION OF HAND | OPERATION MODE | INFORMATION TO BE SENT |
|---|---|---|---|---|
| T_000 | D_000 | — | RESTRICTING MODE | NONE OR MOVING DISTANCE (0, 0) |
| ⋮ | ⋮ | | | |
| T_100 | D_100 | | | |
| T_105 | D_105 | NOD | | |
| ⋮ | ⋮ | | | |
| T_150 | D_150 | | THIRD CONDITION SATISFIED | |
| T_155 | D_155 | MOVE | MOVING MODE | MOVING SIGNAL |
| ⋮ | ⋮ | | | |
| T_250 | D_250 | | | |
| T_255 | D_255 | STOP | | NONE OR MOVING DISTANCE (0, 0) |
| ⋮ | ⋮ | | | |
| T_350 | D_350 | | SECOND CONDITION SATISFIED | |
| T_355 | D_355 | LOOK DOWN | PRESSING MODE | PRESSING SIGNAL |
| ⋮ | ⋮ | | | |
| T_400 | D_400 | | | |
| T_405 | D_405 | STOP | | NONE OR MOVING DISTANCE (0, 0) |
| ⋮ | ⋮ | | | |
| T_450 | D_450 | | FIRST CONDITION NOT SATISFIED | |
| T_455 | D_455 | — | RESTRICTING MODE | NONE OR MOVING DISTANCE (0, 0) |
| ⋮ | ⋮ | | | |
| T_500 | D_500 | | | |
| ⋮ | ⋮ | ⋮ | ⋮ | |

DEVICE, INFORMATION PROCESSING METHOD AND PROGRAM

BACKGROUND

Field

The present invention relates to a device, an information processing method and a program.

Description of Related Art

A technique of controlling input operation, e.g., click operation, for an input unit such as mouse by using a sensor that detects a motion of a predetermined body part of a user, is known (e.g., see Patent Publication JP-A-2023-179927).

SUMMARY

In the case of the prior art, movement of a pointer is temporarily restricted after executing a click operation or the like, to prevent an unintended operation by the user. In the verification tests of this technique, a need has emerged to perform input operation, e.g., click by moving the pointer continuously even after executing the operation based on the user motion, instead of always restricting the movement of the pointer. This means that there is room for improvement in movement of the pointer based on the motion of the user and improvement in usability for input operation.

With the foregoing in view, it is an object of the present disclosure to improve movement of the pointer based on the user motion, and usability for input operation.

A device according to an aspect of the disclosed technique is a device for operating an operation target device including a display screen, and includes a processor. The processor executes: acquiring operation information on a motion of a predetermined body part of a user from a sensor mounted on the body part; controlling a pointer displayed on a display screen, based on an operation mode, which is set to one of (1) a moving mode in which a moving signal relating to moving, over the display screen, the pointer displayed on the display screen is transmittable to the operation target device, based on the motion information, (2) a restricting mode in which movement of the pointer on the display screen is restricted, and (3) a pressing mode in which a pressing signal relating to executing a pressing operation at a position of the pointer on the display screen is transmittable to the operation target device, based on the motion information; setting the operation mode to the pressing mode; and after setting the operation mode to the pressing mode, setting the operation mode after the pressing operation, to either the moving mode or the restricting mode, based on whether or not the motion information on a first motion, to send the pressing signal and the motion information on a second motion after the first motion, out of the motion information acquired in the pressing mode, satisfies a first condition relative to the motion of the predetermined body part.

According to the present disclosure, movement of the pointer, based on the motion of the user, and usability for input operation, can be improved.

BRIEF DESCRIPTION OF DRAWINGS

FIG. 2 is a diagram depicting an overview of motion of an information processing device according to an embodiment;

FIG. 5 is a table indicating an example of motion information according to an embodiment;

FIG. 6 is a table indicating an example of a relationship of data, motion, output and the like according to an embodiment;

FIG. 7 is a table indicating an example of a relationship of data, motion, output and the like according to an embodiment;

DETAILED DESCRIPTION

Embodiments of the present invention will now be described with reference to the drawings. The embodiments to be described below however are merely examples, and are not intended to exclude applying various modifications and techniques not explicitly stated below. In other words, the present invention can be modified in various ways within a scope of not departing from the spirit thereof. In the following description on the drawings, same or similar portions are denoted with same or similar reference signs. The drawings are schematically drawn and do not always match with actual dimensions, ratios, and the like. Between drawings as well, dimensional relationships and ratios may be different from each other.

Embodiments

In embodiments, an eyewear device will be described as an example of a device to operate an operation target device which includes a display screen, but the present invention is not limited thereto. The information processing device according to an embodiment may be a device integrated with an eyewear, or may be an external device which is attached to regular eyewear (e.g., glasses) which the user normally wears. The device integrated with an eyewear may be a device embedded in the eyewear, or a device that is not removable from the eyewear (or a device that may be damaged if removed). The device may be such a wearable device as a ring type device and a watch type device, or may be such a general purpose information processing device as a personal computer, a smartphone and a tablet terminal.

Figure 1:
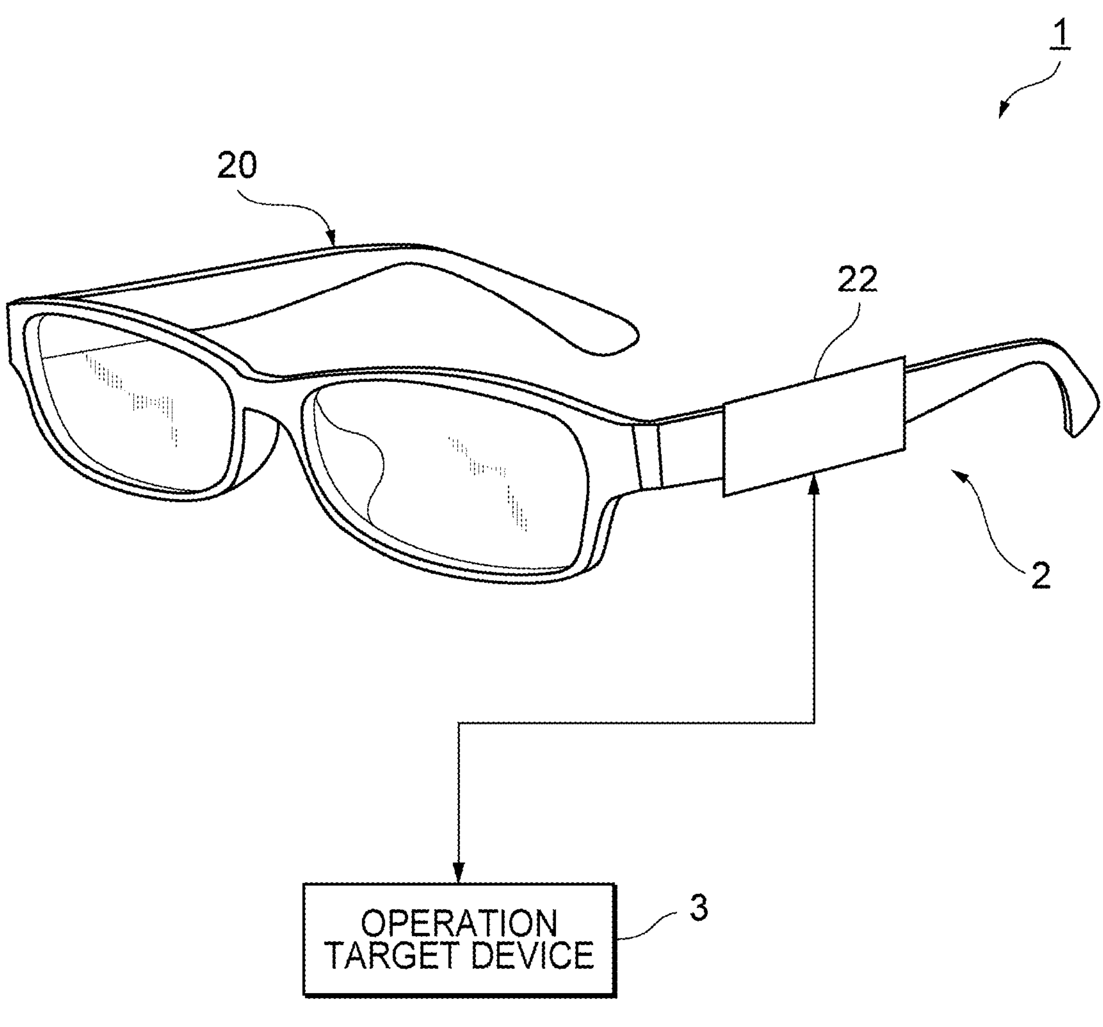
FIG. 1 is a diagram depicting an example of an information processing system according to an embodiment.

FIG. 1 is a diagram depicting an example of an information processing system 1 according to an embodiment. The information processing system 1 in FIG. 1 includes an eyewear device 2 and an operation target device 3 which is operated by the eyewear device 2. The operation target device 3 and the eyewear device 2 are connected via a network and can communicate data with each other.

The eyewear device 2 includes an information processing device 22 on a frame 20. The information processing device 22 includes a sensor. The information processing device 22 acquires motion information on a motion of a predetermined body part (in this case, head of user) on which the eyewear device 2 is mounted. The information processing device 22 sends a signal to operate the operation target device 3 based on this motion information. In other words, according to the eyewear device 2, the operation target device 3 can be operated based on the motion of the head of the user. The frame 20 is an example of a main body of the eyewear device 2, configured to be mountable on the head of the user.

In the embodiment to be described below, the predetermined body part is a head of the user, but the present invention is not limited thereto. The predetermined body part is different depending on the body part on which the device, according to an aspect of the disclosed technique, is mounted. For example, in a case where the device is a ring type, the predetermined body part can be a finger, hand, arm, or the like.

The operation target device 3 is an information processing device having a communication function. The operation target device 3 is, for example, a server device, a personal computer, a tablet terminal, or a portable terminal (e.g., smartphone). The operation target device 3 receives a signal from the information processing device 22, and executes processing corresponding to this signal.

In one embodiment, the operation target device 3 recognizes the information processing device 22 as an input device (e.g., mouse) by communicably connecting with the information processing device 22. For an example, the operation target device 3 receives a moving signal, to move a pointer (a cursor) on the display screen of this operation target device 3, from the information processing device 22. For another example, the operation target device 3 receives a pressing signal, to execute a pressing operation (e.g., left click, right click, double click, scroll, drag and drop) at a position of the pointer on the display screen of this operation target device 3, from the information processing device 22.

FIG. 2 is a state transition diagram depicting an overview of a motion example of the information processing device 22. The information processing device 22 stores operation modes of: a moving mode, a restricting mode and a pressing mode, and the information processing device 22 is set to one of these modes. Based on the operation mode that is set, the information processing device 22 executes various processing steps.

The moving mode is an operation mode in which a moving signal is sent to the operation target device 3 based on motion information. The operation target device 3 moves the pointer based on the received moving signal.

The pressing mode is an operation mode in which a pressing signal is sent to the operation target device 3 based on the motion information. The operation target device 3 executes the pressing operation at the position of the pointer based on the received pressing signal.

The restricting mode is an operation mode in which operation of the pointer is restricted. For example, in the case where the operation mode is set to the restricting mode, the information processing device 22 does not send the moving signal or the pressing signal. For another example, in the case where the operation mode is set to the restricting mode, the information processing device 22 sends a signal to perform less types or less amount of operations compared with the case where the operation mode is set to a mode other than the restricting mode. For another example, in the case where the operation mode is set to the restricting mode, the information processing device 22 sends a signal to not move the pointer.

The information processing device 22 changes the operation mode based on the motion information. Each arrow in FIG. 2 indicates a transition of the operation mode according to the embodiment.

In one embodiment, in a case where the operation mode is set to the restricting mode and where it is determined that the user nodded their head based on the motion information, the information processing device 22 changes the operation mode from the restricting mode to the moving mode (S1). Thereby the state where the operation of the operation target device 3 is restricted is changed to the state where the user can move the pointer. The user nodding their head is an example of the third condition which will be described later.

In one embodiment, in a case where the operation mode is set to the moving mode and where it is determined that the head of the user is at a standstill for a predetermined time based on the motion information, the information processing device 22 changes the operation mode from the moving mode to the pressing mode (S2). Thereby the state where the user can move the pointer is changed to the state where the pressing operation can be performed at the position of the pointer. The head of the user, at a standstill for a predetermined time, is an example of the second condition which will be described later.

In one embodiment, in a case where the operation mode is set to the pressing mode and then the pressing operation is performed based on the motion of the user, which is described later, the information processing device 22 changes the operation mode to one of the restricting mode and the moving mode based on whether a predetermined condition is satisfied (S3/S4). If a predetermined condition to change the operation mode to the moving mode (later mentioned first condition) is satisfied here, the information processing device 22 changes the operation mode from the pressing mode to the moving model. If it is determined that this predetermined condition is not satisfied, the information processing device 22 changes the operation mode from the pressing mode to the restricting mode.

For example, the predetermined condition is that the head of the user moved in a first direction, and then moved in a second direction which is the opposite of the first direction. In other words, in a case where it is determined that the head of the user moved in the first direction and then moved in the second direction, which is the opposite of the first direction (i.e. when the head of the user is returned to the original direction) based on the motion information, the information processing device 22 changes the operation mode from the pressing mode to the moving mode (S3). In a case where the head of the user moved in the first direction and then not moved in the second direction, which is the opposite direction (e.g., the head of the user moved in the first direction, then stopped there for a predetermined time) based on the motion information, the information processing device 22 changes the operation mode from the pressing mode to the restricting mode (S4).

In the disclosed technique, moving of the predetermined body part in a certain direction may be a parallel or rotating movement.

Here in Patent Publication JP-A-2023-179927, for example, the mode to restrict the movement of the pointer is set every time the pressing operation is performed at the position of the pointer. In the case of this technique, mis-movement operation by the user can be prevented after the pressing operation is performed at the position of the pointer. However, there is a need to operate the pointer continuously even after the user performs the pressing operation (e.g., there is the need to perform a new input operation by moving the pointer immediately after performing the press operation). Therefore, in this disclosed technique, this need is satisfied, and usability is improved.

According to the disclosed technique, when the pressing operation is executed at the position of the pointer, the user can select whether the operation mode is changed to the moving mode and the pointer is continuously operated, or the operation mode is changed to the restricting mode and the operation is interrupted based on their own motion. Thereby usability to continuously operate the pointer can be improved while preventing erroneous operation by the user.

Configuration of Operation Target Device 3

Figure 3:
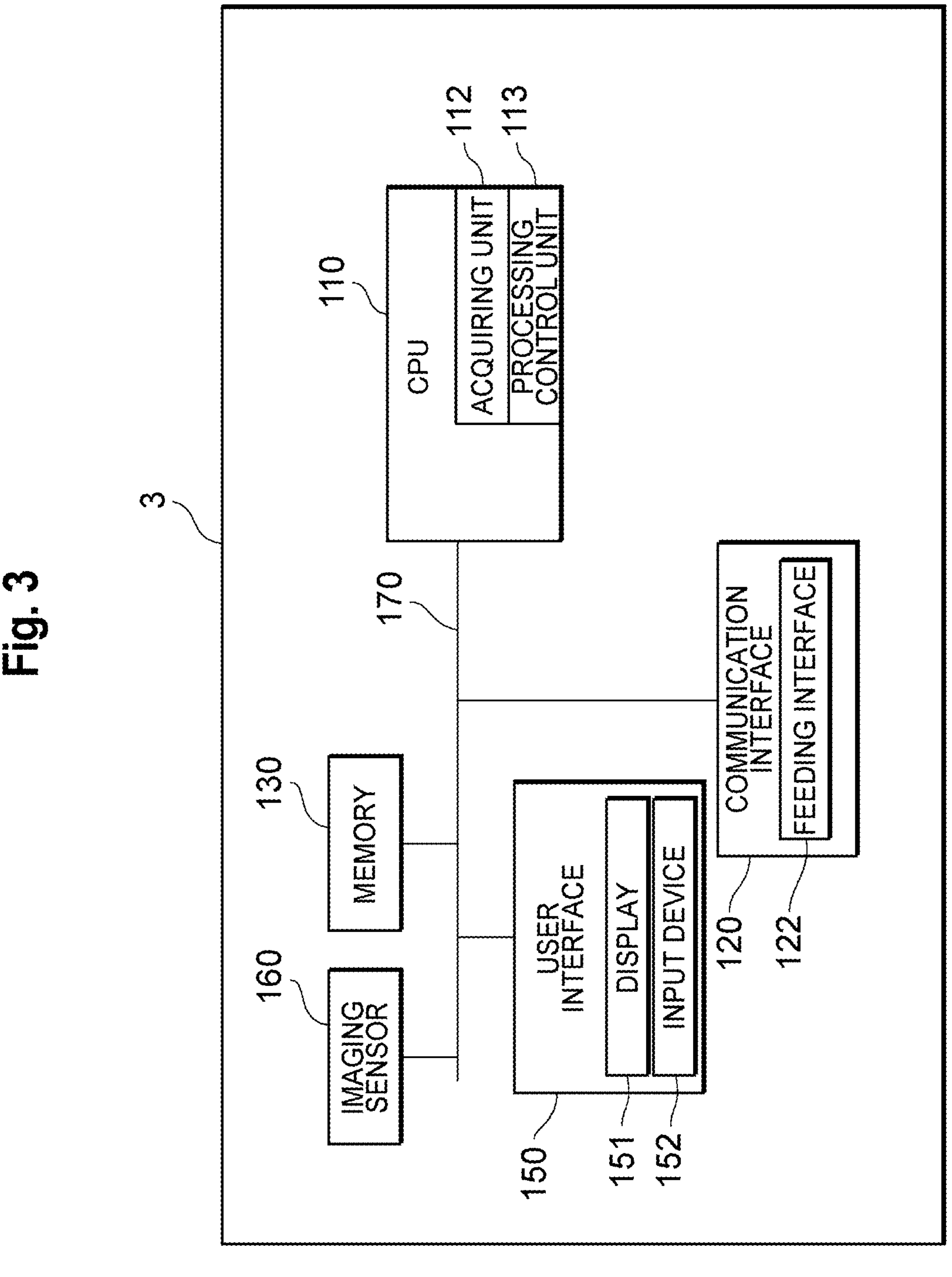
FIG. 3 is a block diagram depicting an example of a configuration of an external information processing device according to an embodiment.

FIG. 3 is a block diagram depicting an example of a configuration of the operation target device 3 according to an embodiment. The operation target device 3 includes one or a plurality of processing units (CPUs) 110, one or a plurality of communication interfaces 120, a memory 130, a user interface 150, an imaging sensor 160, and one or a plurality of communication buses 170 to interconnect these composing elements.

The communication interface 120 can perform data communication with the information processing device 22 via a wired LAN cable, a USB cable, a mobile communication antenna, and a wireless LAN communication antenna.

In one embodiment, the communication interface 120 includes a feeding interface 122. The feeding interface 122 is configured to supply power to other devices connected via the communication interface 120.

The user interface 150 is a display device, an input device (e.g., keyboard and/or mouse, pointing device), and the like. The user interface 150 can move the pointer displayed on the display device. The imaging sensor 160 is an image sensor which receives an optical signal, converts this optical signal into an electric signal, and generates an image thereby. The image includes at least one of a still image and a moving image.

The memory 130 is, for example, a high-speed random access memory, such as DRAM, SRAM and other random access solid-state storage devices, or may be a non-volatile memory, such as one or a plurality of magnetic disk storage devices, an optical disk storage device, a flash memory device and other non-volatile solid-state storage devices, or may be a computer-readable non-transitory recording medium.

The memory 130 stores data used by the information processing system 1. For example, the memory 130 stores data sent from the eyewear device 2 (information processing device 22).

The memory 130 may also be one or a plurality of storage devices which are installed remotely from the CPU 110. In one embodiment, the memory 130 stores programs executed by the CPU 110, modules and data structures, or subsets thereof.

The CPU 110 implements an acquiring unit 112 and a processing control unit 114 by executing programs stored in the memory 130.

The acquiring unit 112 acquires a moving signal, a pressing signal, or the like, from the information processing device 22 of the eyewear device 2. The moving signal may include information on a moving distance of the pointer. The information on the moving distance of the pointer can be expressed by a relative moving distance from the current position of the pointer on the display screen, for example. In the present disclosure, the moving signal is expressed by "moving distance ($\alpha$, $\beta$)". This means that the pointer is moved by $\alpha$ from the current position in the x axis direction, and is moved by $\beta$ from this position in the y axis direction. In this case, the moving signal to not move the pointer is expressed by "moving distance (0, 0)". This expression format is merely for explanatory convenience, and is not intended to limit the actual signal format. The pressing signal may include information related to the pressing operation that is executed at the position of the pointer on the display screen.

The processing control unit 113 executes processing corresponding to the signal acquired by the acquiring unit 112. The processing control unit 113 moves the pointer based on the moving signal. The processing control unit 113, based on the pressing signal, executes pressing operation corresponding to the pressing signal.

In the operation target device 3, a program to perform display in corresponding to a UI auxiliary signal (described later) may be installed.

Configuration of Information Processing Device 22

Figure 4:
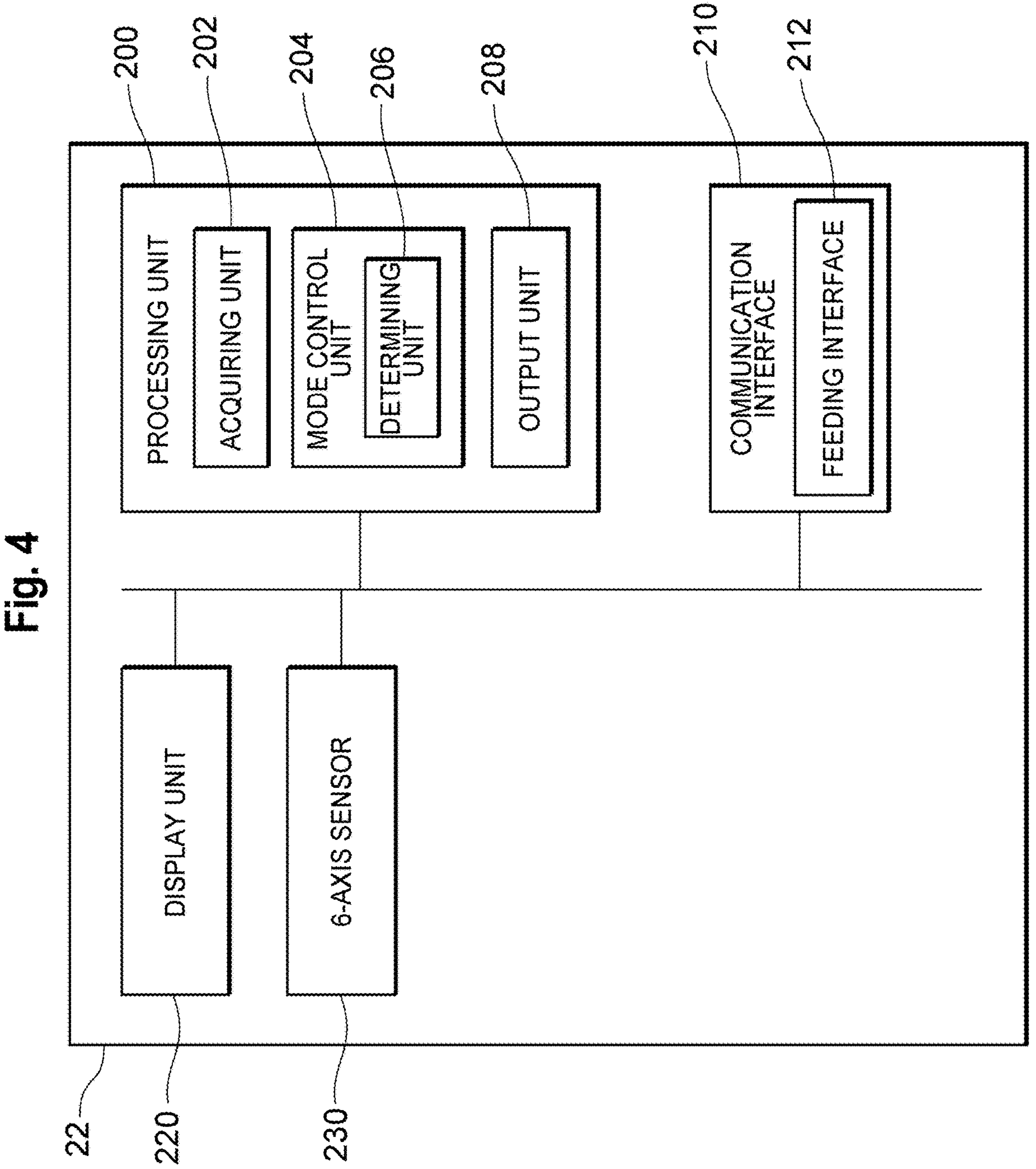
FIG. 4 is a block diagram depicting an example of a configuration of an information processing device according of an embodiment.

FIG. 4 is a block diagram depicting an example of a configuration of the information processing device 22 according to an embodiment. As indicated in FIG. 4, the information processing device 22 includes a processing unit 200, a communication interface 210, a display unit 220 and a 6-axis sensor 230. The information processing device 22 also includes a memory to store processing data. This memory may be a computer-readable non-transitory recording medium.

The 6-axis sensor 230 includes a 3-axis acceleration sensor and a 3-axis angular velocity sensor (or a 3-axis angular acceleration sensor). The 6-axis sensor 230 is installed in the information processing device 22 on the eyewear device 2. Here the eyewear device 2 is mounted on the head of the user. Hence the 6-axis sensor 230 generates motion information on the motion of the head of the user. For example, the motion information includes measurement values of acceleration and angular velocity, measured at a predetermined sampling rate. The 6-axis sensor 230 outputs the generated motion information to the processing unit 200.

As mentioned above, the information processing device 22 is installed on the eyewear device 2 which is mounted on the head of the user. Of human body parts, the head is a part where vibration unintended by the user is not generated very much. Therefore according to this configuration, noise included in the motion information generated by the 6-axis sensor 230 can be minimized.

The processing unit 200 includes an acquiring unit 202, a mode control unit 204, and an output unit 208. The processing unit 200 includes a processor.

The acquiring unit 202 acquires the motion information from the 6-axis sensor 230. In one embodiment, the motion information includes measurement values measured by the 6-axis sensor 230 at each of a plurality of timings. The acquiring unit 202 may sequentially acquire motion information including the measurement values generated by the 6-axis sensor 230, or may acquire motion information including a plurality of measurement values generated by the 6-axis sensor 230 during a predetermined period. Acquisition of the motion information by the acquiring unit 202 includes acquisition of the motion information directly or indirectly from the 6-axis sensor 230.

The mode control unit 204 sets the operation mode to one of: the moving mode, the restricting mode, and the pressing mode. The mode control unit 204 includes a determining unit 206.

Determining Unit 206

In one embodiment, the determining unit 206 determines whether or not the motion information acquired by the acquiring unit 202 satisfies a first condition, a second condition, and a third condition related to the motion of the head of the user. In one embodiment, whether or not the motion information satisfies the first condition is determined depending on whether or not the motion of the head of the user, that was specified based on the motion information, is a motion corresponding to the first condition. In the same manner, in one embodiment, whether or not the motion information satisfies the second condition is determined depending on whether or not the motion of the head of the user, that was specified based on the motion information, is a motion corresponding to the second condition. In the same manner, in one embodiment, whether or not the motion information satisfies the third condition is determined depending on whether or not the motion of the head of the user, that was specified based on the motion information, is a motion corresponding to the third condition. The motion corresponding to the first condition, the operation corresponding to the second condition, and the motion corresponding to the third condition may be different from each other, and each operation may include one or more steps (e.g., turning the head to the left, then back to the front).

In one embodiment, whether or not the motion of the head of the user, that was specified based on the motion information, is a predetermined motion (e.g., motion corresponding to any one of the above mentioned first to third conditions) may be determined based on the direction of the rotation of the head of the user, transition and cumulative value of the rotation amount, and the like, that was specified based on the motion information. For example, when the rotation of the head of the user, that was specified based on the motion information in a predetermined time, is along the first direction and the cumulative value of the rotation amount thereof exceeds a predetermined threshold (e.g., 30°), the determining unit 206 may determine that the user turned in the first direction. For another example, when the motion of the head of the user, that was specified based on the motion information in the predetermined time, rotated exceeding a predetermined threshold in the first direction, and then rotated in the second direction, which is an opposite direction of the first direction, exceeding the predetermined threshold, the determining unit 206 may determine that the user shook their neck.

Mode Control Unit 204

The mode control unit 204 changes the operation mode based on the determination result by the determining unit 206.

In one embodiment, in a case where the operation mode is set to the pressing mode, it is determined whether or not the motion information on the first motion to send the pressing signal and the motion information on the second motion after the first motion, out of the motion information acquired in the pressing mode, satisfies the first condition for the motion of the head of the user. Based on the determination result for the first condition by the determining unit 206, the mode control unit 204 sets the operation mode after the pressing operation to either one of the moving mode and the restricting mode (see S3/S4 in FIG. 2). For example, if it is determined that the operation information satisfies the first condition, the mode control unit 204 sets the operation mode after the pressing operation to the moving mode, and if it is determined that the motion information does not satisfy the first condition, the mode control unit 204 sets the operation mode after the pressing operation to the restricting mode.

The first motion and the second motion need not be continuous. For example, "the second motion after the first motion" may be "the second motion immediately after the first motion", or "the second motion after another motion that is performed after the first motion", or may be "the second motion that is performed during a predetermined period after the first motion".

In another embodiment, in a case where the operation mode is set to the pressing mode and the later mentioned output unit 208 sends a pressing signal based on the motion information, the determining unit 206 determines whether or not this motion information (that is, the motion information based on which pressing signal was sent) satisfies the first condition for the motion of the head of the user.

In the present disclosed technique, In the disclosed technology, "performing the second processing when executing the first processing" allows the order of the first processing and the second processing to be arbitrary, as long as the first process and the second process are performed continuously or integrally.

In one embodiment, the first condition is that the motion information on the first motion (motion information for sending the pressing signal) includes information indicating that the head of the user moved in the first direction, and the motion information on the second motion (motion information after the first motion) includes information indicating that the head of the user moved in the second direction. In other words, the first condition may include a condition that the pressing signal is sent due to the head of the user moving in the first direction, and then the head of the user moves further in the second direction. In one embodiment, the first condition further includes a condition that the period between the motion of the head of the user in the first direction and further motion of the head of the user in the second direction thereafter is not more than a threshold specified for continuity of the motion in the first direction and the motion along the second direction.

In one embodiment, the second direction is the opposite direction of the first direction. For example, a state where the head of the user moves in the first direction, then further moves in the second direction (opposite of the first direction) means that "the user nods (that is, the user looks down and then faces to the front)", "the user turns to the left and then faces to the front", "the user turns to the right and then faces the front", or "the user looks up and then faces to the front", or the like. A state where the head of the user moves in the first direction and does not move in the second direction (opposite of the first direction) thereafter, on the other hand, means that "the user turns to the left and stops moving their head in that state", for example.

As mentioned above, another motion may be performed between the first motion and the second motion, hence "the user turning to the left (first motion), nodding up and down (another operation), and then facing to the front (second operation)" may be included in "the user turning to the left and then facing to the front".

In one embodiment, in the case where the operation mode is set to the moving mode, the determining unit 206 determines whether or not the motion information that is acquired in the moving mode satisfies the second condition for the motion of the head of the user. If the determining unit 206 determines that the motion information satisfies the second condition, the mode control unit 204 sets the operation mode to the pressing mode (see S2 in FIG. 2). In one embodiment, the second condition includes that the motion information indicates that the head of the user is stopped moving for a predetermined period. The second condition described here is merely an example, and the motion of the head of the user related to the second condition may be set freely.

In one embodiment, in a case where the operation mode is set to the restricting mode, the determining unit 206 determines whether or not the motion information acquired in the restricting mode satisfies the third condition for the motion of the head of the user. If the determining unit 206 determines that the motion information satisfies the third condition, the mode control unit 204 sets the operation mode to the moving mode (see S1 in FIG. 2). In one embodiment, the third condition includes that the determining unit 206 determines that the head of the user nodded. The third condition described here is merely an example, and the motion of the head of the user related to the third condition may be set freely.

The output unit 208 may output the moving signal and the operation signal based on the operation mode set by the mode control unit 204 and motion information acquired by the acquiring unit 202. Specifically, if the operation mode is set to the moving mode, the output unit 208 outputs the moving signal based on the motion information. If the operation mode is set to the pressing mode, the output unit 208 outputs the pressing signal based on the motion information. If the operation mode is set to the restricting mode, the output unit 208 restricts output of the moving signal and the operation signal. Outputting the moving signal may be outputting a signal of a moving distance ($\alpha$, $\beta$) (at least one of $\alpha$ and $\beta$ is not zero). Restricting the output of the moving signal may be outputting a signal of a moving distance (0, 0).

In one embodiment, the output unit 208 outputs a moving signal to move the pointer, so as to follow a motion of the head (or visual line) of the user that is specified based on the motion information. For example, if it is specified that the head of the user turned in the left direction based on the motion information, the output unit 208 sends the moving signal to move the pointer in the left direction on the display screen of the operation target device 3. For another example, if it is specified that the head of the user turned in the upper right direction based on the motion information, the output unit 208 sends a moving signal to move the pointer in the upper right direction on the display screen of the operation target device 3. According to this configuration, the user can move the pointer intuitively.

In one embodiment, based on the first motion information, the output unit 208 outputs a pressing signal to execute the first pressing operation corresponding to this first motion information at the position of the pointer, and based on the second motion information, the output unit 208 outputs a pressing signal to execute the second pressing operation corresponding to this second motion information at the position of the pointer. For example, based on the motion information indicating a motion of the head of the user looking down and then facing the front, the output unit 208 outputs a pressing signal to execute the left click (an example of the pressing operation) at the position of the pointer. For another example, based on the motion information indicating a motion of the head of the user turning to the right and then facing the front, the output unit 208 outputs a pressing signal to execute the right click (an example of the pressing operation) at the position of the pointer. According to this configuration, the user can easily execute a plurality of different pressing operations at the position of the pointer.

An example of the correspondence between motions of the head of the user and pressing operations is as described in the following (1) to (6). In each of (1) to (6), the left side indicates the motion of the head of the user, and the right side indicates the pressing operation executed at the position of the pointer when it is determined that this motion was performed based on the motion information.

(1) looking down . . . left click, (2) looking up . . . double click, (3) turning to right . . . right click, (4) turning to left . . . start drag and drop, (5) tilting to right . . . down scroll, and (6) tilting to left . . . up scroll.

In one embodiment, the output unit 208 outputs a user interface (UI) auxiliary signal. The UI auxiliary signal is a signal to display information to assist the user on the display screen of the operation target device 3. The UI auxiliary signal may be information to display the information, related to the operation method in the case where the operation mode is set to the pressing mode, on the display screen of the operation target device 3. For example, the UI auxiliary signal is a signal to display the currently set operation mode (moving mode, pressing mode or restricting mode), on the display screen of the operation target device 3. For another example, the UI auxiliary signal is a signal to display the information on the relationship of each motion information and the pressing operation corresponding to this motion information, on the display screen of the operation target device 3. A screen example based on the UI auxiliary signal will be described in detail later with reference to FIGS. 9A to 9D.

The processing unit 200 packetizes the moving signal, operation signal, and the like, and may output the packets to the communication interface 210 via the output unit 208.

The display unit 220 may be comprised of LED lights, a light crystal display, or the like. The display unit 220 displays characters, colors, symbols or the like, based on at least a part of the information outputted by the output unit 208. The display unit 220 is an example of the output device included in the eyewear device 2.

The communication interface 210 sends the moving signal, operation signal, UI auxiliary signal, and the like, outputted by the output unit 208, to the operation target device 3. The communication interface 210 performs data communication with the operation target device 3 via a wired LAN cable, USB cable, mobile communication antenna, wireless LAN communication antenna.

In one embodiment, the communication interface 210 includes a feeding interface 212. The feeding interface 212 is configured to receive power from other devices connected via the communication interface 210.

In one embodiment, the eyewear device 2 does not include a battery for power. In this case, the information processing device 22 may receive power from the operation target device 3 via the feeding interface 212. According to this configuration, the eyewear device 2 can be lighter.

Data Example

FIG. 5 is a table indicating an example of the motion information according to an embodiment. The motion information in FIG. 5 indicates data acquired at this predetermined sampling rate (e.g., 20 Hz=0.05 sec). D_1, D_2, . . . D_60 and the like may be vectors each of which is constituted of measurement values measured by the 6-axis sensor 230. For example, this vector includes measurement values of acceleration and angular velocity. The data in FIG. 5 is stored in a memory in the information processing device 22, for example. The motion information may further include information related to the moving speed of the visual line based on an ocular potential signal.

Motion Example 1

FIGS. 6 and 7 are tables indicating examples of a relationship of the motion information at each of a plurality of timings, motion of the head of the user at a timing, operation mode that is set, and information that is sent from the information processing device 22 to the operation target device 3. FIG. 6 is an example of motion in a case where it is determined that the first condition is satisfied when the pressing signal is sent, and the mode control unit 204 changes the operation mode from the pressing mode to the moving mode. FIG. 7, on the other hand, is an example of motion in a case where it is determined that the first condition is not satisfied when the pressing signal is sent, and the mode control unit 204 changes the operation mode from the pressing mode to the restricting mode.

At timing T_000 in the initialized state, it is assumed that the operation mode is set to the restricting mode. Therefore in a period from timing T_000 to timing T_150, which is just before the operation mode is changed, the output unit 208 does not send the moving signal and the pressing signal, or send a signal of moving distance (0, 0), regardless the head motion of the user.

Then it is assumed that the user nodded in a period from timing T_105 to timing T_150. In this case, the determining unit 206 determines that the user nodded, based on the motion information (D_105 to D_150) from timing T_105 to timing T_150. Based on this determination that the user nodded, the determining unit 206 determines that the third condition (condition to change the operation from the restricting mode to the moving mode) is satisfied. Based on this determination that the third condition is satisfied, the mode control unit 204 sets the operation mode to the moving mode. The motion information (D_105 to D_150) in the period from timing T_105 to timing T_150 is an example of the motion information acquired in the restricting mode.

It is assumed that the user moves their head to move the pointer in the period from timing T_155 to timing T_250. Here the operation mode has been set to the moving mode, hence the output unit 208 sends the moving signal continuously based on the motion information (D_155 to D_250) acquired in this period.

It is assumed that the user stops moving their head in the period from timing T_255 to timing T_350. Thereby in this period, the output unit 208 stops sending the moving signal. Instead of stopping sending the moving signal, the output unit 208 may send the moving signal (0, 0).

The determining unit 206 also determines that the head of the user stopped moving during a predetermined period based on the motion information (D_255 to D_350) in the period from timing T_255 to timing T_350. Further, based on the determination that the head of the user stopped moving during a predetermined period, the determining unit 206 determines that the second condition (condition to change the operation mode from the moving mode to the pressing mode) is satisfied. Based on the determination that the second condition is satisfied, the mode control unit 204 sets the operation mode to the pressing mode. The motion information (D_255 to D_350) in the period from timing T_255 to timing T_350 is an example of the motion information acquired in the moving mode.

Then it is assumed that the user looks down in a period from timing T_355 to timing T_400. The determining unit 206 determines that the head of the user moved downward based on the motion information (D_355 to D_400) from timing T_355 to timing T_400. Based on this determination that the head of the user moved downward, the output unit 208 sends a pressing signal to execute the pressing operation (e.g., left click) corresponding to this motion at the position of the pointer. The motion information (D_355 to D_400) in the period from timing T_355 to timing T_400 is an example of the motion information on the first motion to send the pressing signal, out of the motion information acquired in the pressing mode.

Then immediately after this, it is assumed that the user faces the front in a period from timing T_405 to timing T_450. The determining unit 206 determines that the head of the user moved upward based on the motion information (D_405 to D_450) from the timing T_405 to timing T_450. Since this operation is not corresponded to the pressing operation, the output unit 208 does not send the pressing signal. The motion information (D_405 to D_450) in the period from timing T_405 to timing T_450 is an example of the motion information on the second motion after the first motion, out of the motion information acquired in the pressing mode.

Based on the series of motions of the head of the user in the period from timing T_355 to timing T_450, the determining unit 206 determines that the user nodded. Further, based on the determination that the user nodded, the determining unit 206 determines that the first condition (condition to change the operation mode from the pressing mode to the moving mode) is satisfied. Based on the determination that the first condition is satisfied when the pressing signal is sent, the mode control unit 204 sets the operation mode to the moving mode. In this example, a case of the user performing the second motion (facing the front) immediately after performing the first motion (looking down) was described for simplification, but another motion may be included between the first motion and the second motion, and the determination result becomes the same even in this case.

The operation mode is set to the moving mode at timing T_455 and later, hence the user can move the pointer by moving their head.

FIG. 7 will be described next. The description of FIG. 7 focuses on the differences from FIG. 6. In FIG. 7, it is assumed that the user stops moving their head in the period from timing T_405 to timing T_450 immediately after the user looked down. The determining unit 206 determines that the head of the user did not move upward, based on the motion information (D_405 to D_450) from timing T_405 to timing T_450. Thereby the determining unit 206 determines that the first condition is not satisfied. Based on the determination that the first condition is not satisfied when the pressing signal is sent, the mode control unit 204 sets the operation mode to the restricting mode.

The operation mode is set to the restricting mode at timing T_455 and later, hence the output unit 208 does not send the moving signal and the pressing signal regardless the motion of the head of the user.

Comparing FIGS. 6 and 7, the operations are the same until the user moves to send the pressing signal, but thereafter the movement of the head of the user is different. Specifically, in the case of FIG. 6, the user looks down and then faces the front. Thereby it is determined that the first condition is satisfied, and the operation mode is changed from the pressing mode to the moving mode. In the case of FIG. 7, on the other hand, the user looks down and stops moving their head in that state. Thereby it is determined that the first condition is not satisfied, and the operation mode is changed from the pressing mode to the restricting mode. In other words, when the user sends the pressing signal by looking down, the user can select whether the pointer is continuously moved or operation of the pointer is interrupted, by facing the front again, or by stopping moving their head in that state.

Motion Example 2

Figure 8:
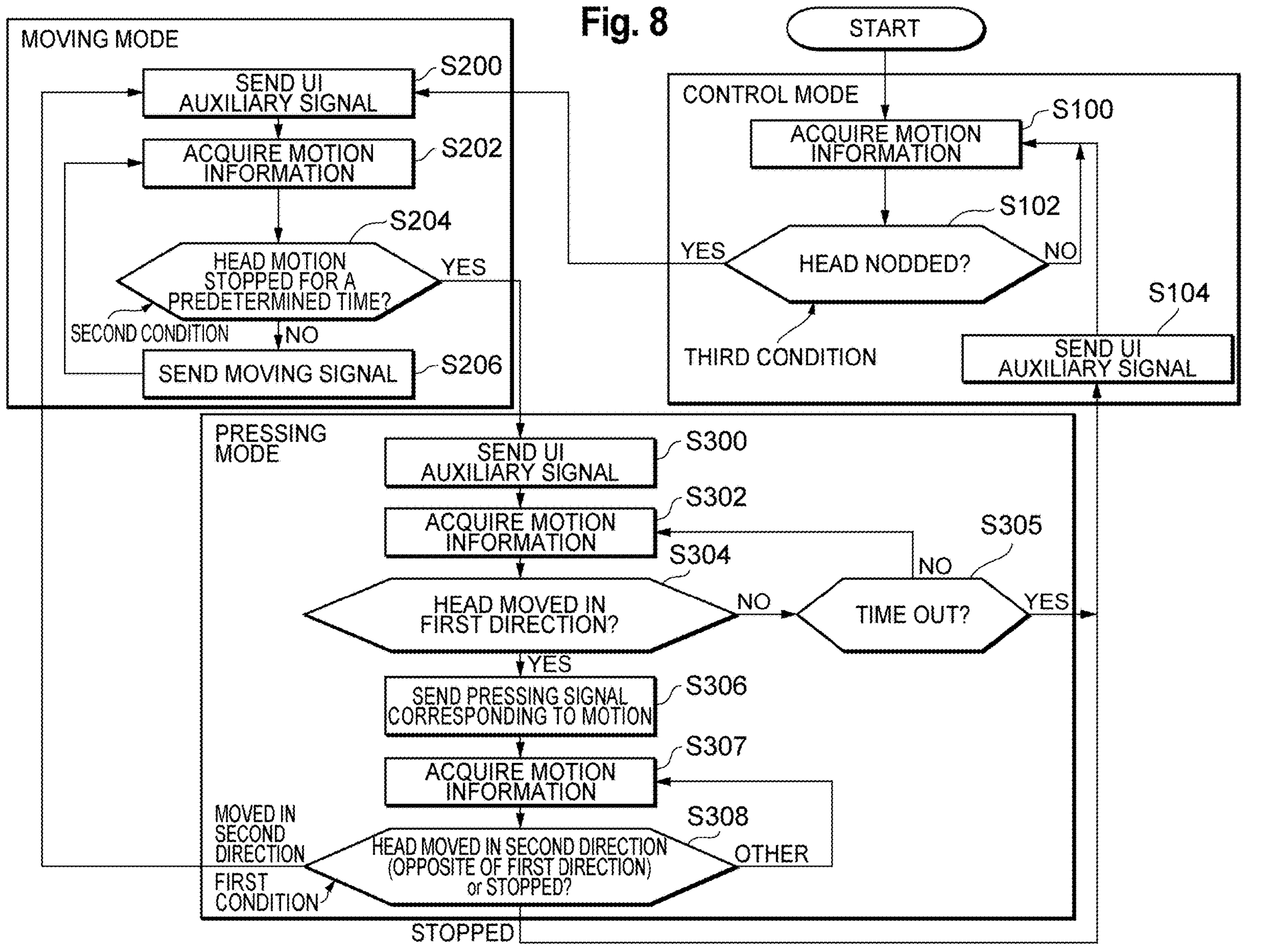
FIG. 8 is a flow chart depicting an example of motion of the information processing device according to an embodiment.

FIG. 8 is a flow chart depicting an example of motion of the information processing device 22. In the initialized state, it is assumed that the operation mode is set to the restricting mode. First in step S100, the acquiring unit 202 acquires the motion information. In step S102, the determining unit 206 determines whether the motion of the head of the user that was specified based on this motion information is nodding. If NO is determined in step S102, the acquiring unit 202 continuously acquires the motion information in step S100. "The motion of the head of the user is nodding" is an example of the third condition.

If YES is determined in step S102, on the other hand, the mode control unit 204 sets the operation mode to the moving mode, and the output unit 208 sends the UI auxiliary signal to the operation target device 3 in step S200. The operation target device 3, which received this UI auxiliary signal, displays information indicating that the currently set operation mode is the moving mode. This information may be text information (see FIGS. 9A to 9D), or may be displayed as a predetermined motion of the pointer (e.g., drawing a circle).

Then in step S202, the acquiring unit 202 acquires the motion information. In step S204, the determining unit 206 determines whether the head of the user stopped moving for a predetermined period based on this motion information. If NO is determined in step S204 (that is, if the head of the user was moving), the output unit 208 send a moving signal based on the motion information in step S206. "The head of the user stopped moving for a predetermined period" is an example of the second condition.

If YES is determined in step S204, on the other hand, the mode control unit 204 sets the operation mode to the pressing mode, and the output unit 208 sends the UI auxiliary signal to the operation target device 3 in step S300. The operation target device 3, which received this UI auxiliary signal, displays information indicating that the currently set operation mode is the pressing mode. The operation target device 3, which received this UI auxiliary signal, also displays information related to a plurality of motions of the head of the user and pressing operation corresponded to each of the plurality of motions.

Then in step S302, the acquiring unit 202 acquires the motion information. In step S304, the determining unit 206 determines whether or not the head of the user moved in the first direction, based on the acquired motion information. If NO is determined in step S304, it is further determined whether or not the time limit until the detection of the motion of the head of the user expired in step S305. If NO is determined in step S305, the acquiring unit 202 continuously acquires the motion information in step S302. If YES is determined in step S305, the mode control unit 204 sets the operation mode to the restricting mode, and the output unit 208 sends the UI auxiliary signal to the operation target device 3 in step S104.

If YES is determined in step S304, on the other hand, the output unit 208 sends the pressing signal, to execute the pressing operation corresponding to the motion of the head of the user in the first direction at the position of the pointer, in step S306. In this case, the motion information acquired in step S302 is an example of the motion information on the first operation to send the pressing signal, out of the motion information acquired in the pressing mode.

Then in step S307, the acquiring unit 202 further acquires the motion information. The motion information acquired here is an example of the motion information on the second motion after the first motion, out of the motion information acquired in the pressing mode.

In step S308, based on the motion information acquired in step S302 and step S307, the determining unit 206 determines whether or not the head of the user moved in the first direction and then moved in the second direction (opposite of the first direction), and whether or not the head of the user stopped moving for a predetermined period. The motion of the head of the user moving in the first direction and then moving in the second direction (opposite of the first direction) is an example of the first condition.

If it is determined that the head of the user moved in the second direction in step S308, the mode control unit 204 sets the operation mode to the moving mode, and the output unit 208 sends the UI auxiliary signal to the operation target device 3 in step S200. The operation target device 3, which received this UI auxiliary signal, displays information indicating that the currently set operation mode is the moving mode.

If it is determined that the head of the user stopped moving for a predetermined period in step S308, on the other hand, the mode control unit 204 sets the operation mode to the restricting mode, and the output unit 208 sends the UI auxiliary signal to the operation target device 3 in step S104. The operation target device 3, which received this UI auxiliary signal, displays information indicating that the currently set operation mode is the restricting mode.

If it is determined that the head of the user neither moved in the second direction nor stopped moving in step S308, the acquiring unit 202 continuously acquires the motion operation information in step S307.

As described above, according to the information processing device 22, the user can operate the operation target device 3 while appropriately switching the operation mode among: the restricting mode, the moving mode and the pressing mode. Particularly, in the case where the operation mode is set to the pressing mode, the user, based on the motion of their own head (see step S302), can send the pressing signal (see step S306) and select whether the operation mode is set to the restricting mode (see NO in step S308), or to the moving mode (see YES in step S308).

The information processing device 22 may execute a part of the processing steps (e.g., acquisition of motion information) in parallel with other processing steps.

Screen Example

A display screen example of the operation target device 3, which received the UI auxiliary signal, will be described with reference to FIGS. 9A to 9D.

Figure 9A:
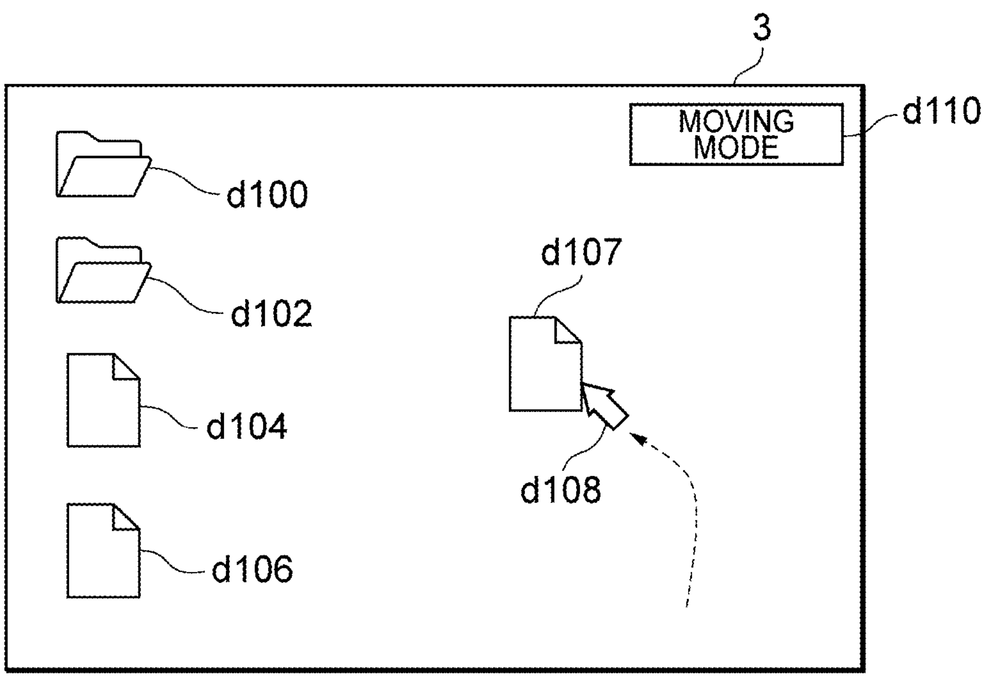
FIG. 9A is a diagram depicting a display screen example of an external information processing device according to an embodiment.

FIG. 9A is a display screen example in a case where the operation mode is set to the moving mode. The display screen in FIG. 9A may be displayed on the operation target device 3 from timing T_155 to timing T_250 in FIGS. 6 and 7, for example. The display screen in FIG. 9A may also be displayed on the operation target device 3 which received the UI auxiliary signal according to step S200 in FIG. 8, for example.

On the display screen example in FIG. 9A, icons d100 to d107, a pointer d108 and an operation mode d110 are displayed. The icons d100 to d107 are UI elements corresponding to a folder, a file and the like, for example. The operation mode d110 is an element indicating the currently set operation mode, and "moving mode" is displayed in FIG. 9A.

Figure 9B:
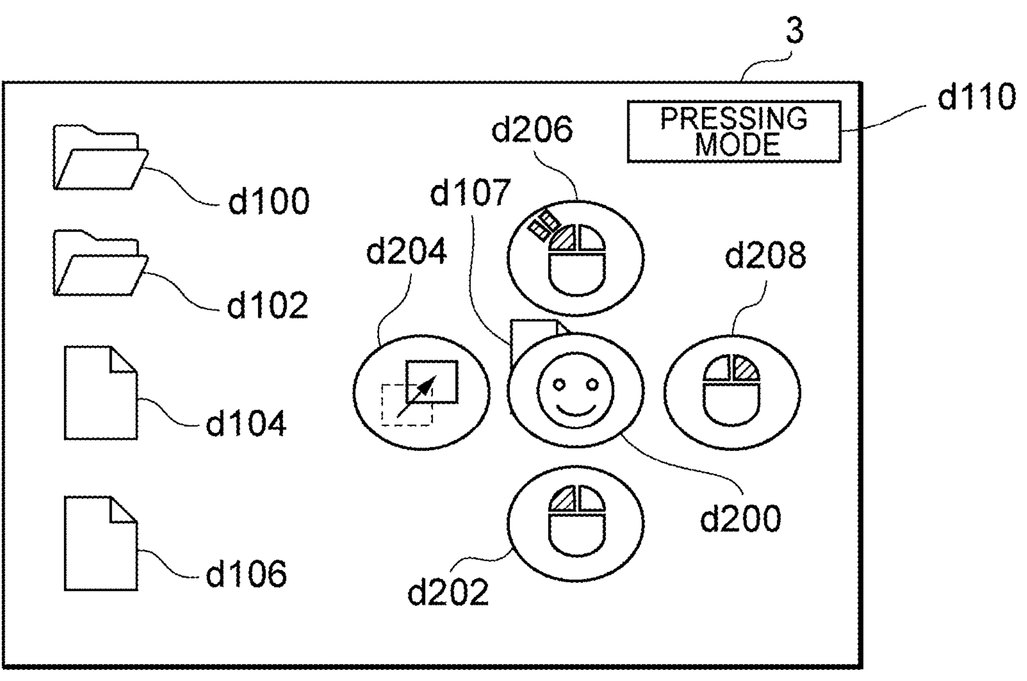
FIG. 9B is a diagram depicting a display screen example of an external information processing device according to an embodiment.

FIG. 9B is a display screen example in a case where the operation mode is set to the pressing mode after determining that the head of the user stopped moving for a predetermined period (that is, after the determination that the second condition is satisfied). The display screen in FIG. 9B may be displayed on the operation target device 3 immediately after timing T_350 in FIGS. 6 and 7, for example. The display screen in FIG. 9B may also be displayed on the operation target device 3 which received the UI auxiliary signal according to step S300 in FIG. 8, for example.

On the display screen example in FIG. 9B, a front face icon d200, a left click icon d202, a drag and drop icon d204, a double click icon d206, and a right click icon d208 are displayed, in addition to the elements displayed on the display screen example in FIG. 9A. In the display screen example in FIG. 9B, "pressing mode" is displayed in the operation mode d110.

The left click icon d202 is displayed below the front face icon d200. This indicates that by the user looking down, a pressing signal, to execute the left click at the position of the pointer d108, is sent.

The drag and drop icon d204 is displayed on the left side of the front face icon d200. This indicates that by the user turning to the left, a pressing signal to start the drag and drop operation for the position of the pointer d108, is sent.

The double click icon d206 is displayed above the front face icon d200. This indicates that by the user looking up, a pressing signal, to execute double click at the position of the pointer d108, is sent.

The right click icon d208 is displayed on the right side of the front face icon d200. This indicates that by the user turning to the right, a pressing signal, to execute right click at the position of the pointer d108, is sent.

Figure 9C:
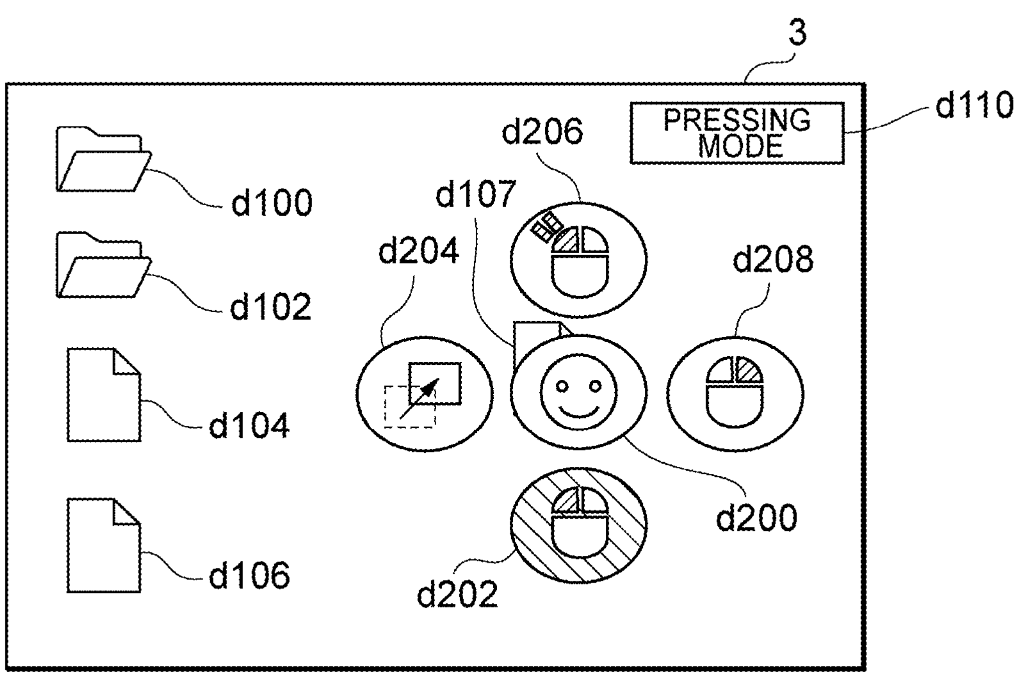
FIG. 9C is a diagram depicting a display screen example of an external information processing device according to an embodiment.

FIG. 9C is a display screen example in a case where the operation mode is set to the pressing mode, and then the user looked down. The display screen in FIG. 9C may be displayed on the operation target device 3 in a period from timing T_355 to timing T_400 in FIGS. 6 and 7. The display screen in FIG. 9C may also be displayed on the operation target device 3 when YES is determined in step S304 in FIG. 8, for example.

On the display screen example in FIG. 9C, a left click icon d202 is highlighted. This indicates that the user looked down, and the condition to execute the left click at the position of the pointer d108 is satisfied.

Figure 9D:
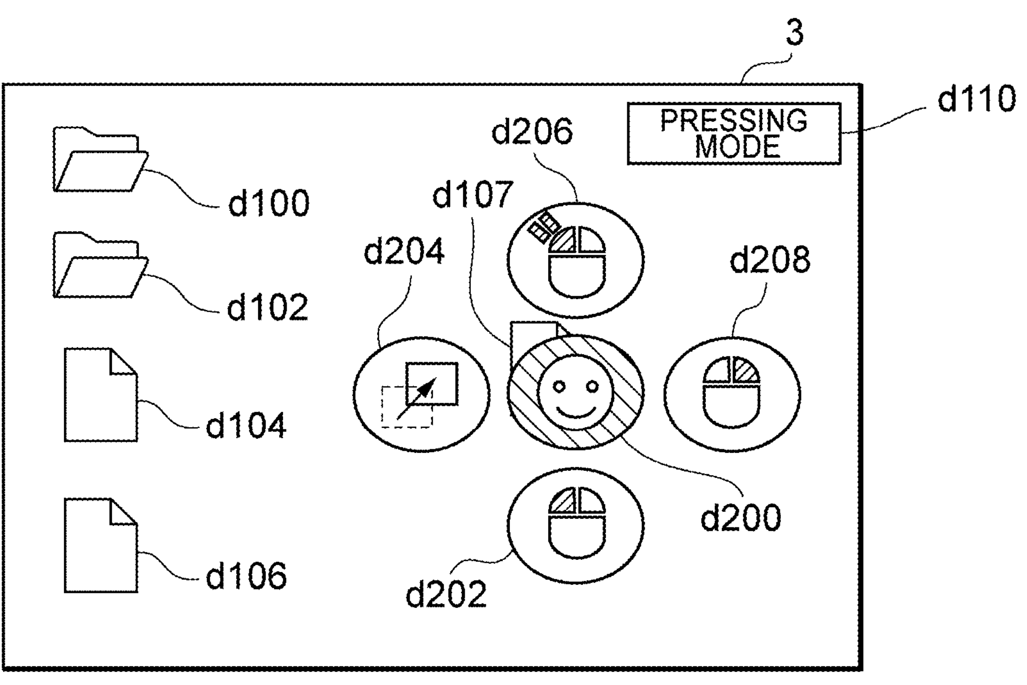
FIG. 9D is a diagram depicting a display screen example of an external information processing device according to an embodiment.

FIG. 9D is a display screen example in a case where the user looked down and then faced the front, that is, in a case where the user moved in the first direction and then moved in the second direction (opposite of the first direction). The display screen in FIG. 9D may be displayed on the operation target device 3 in a period from timing T_405 to timing T_450 in FIG. 6, for example. The display screen in FIG. 9D may also be displayed on the operation target device 3 when YES is determined in step S308 in FIG. 8, for example.

On the display screen example in FIG. 9D, the front face icon d200 is highlighted. This indicates that the user looked down and the faced the front, and the condition to change the operation mode from the pressing mode to the moving mode (first condition) is satisfied.

According to this configuration, the user can easily recognize which operation the user can perform.

The present invention has been described using embodiments, but the technical scope of the present invention is not limited to the above mentioned embodiments. It is obvious to an expert skilled in the art that the above mentioned embodiments can be modified or improved in various ways. Such modified and improved modes can also be included in the technical scope of the present invention, as is clearly disclosed in the claims.

Modification 1

In the embodiments described above, the information processing device 22 on the eyewear device 2 side performs steps from acquiring the motion information to outputting the pressing signal, and the operation target device 3 executes the pressing operation based on the received pressing signal, but the present invention is not limited to this example. For example, the information processing device 22 may send the motion information to the operation target device 3, and the operation target device 3 may generate the pressing signal based on the received motion information. In this case, the operation target device 3 may have a function of the above mentioned processing unit 200, so as to output the pressing signal to the operating system (OS), or the like, and control the movement and operation of the pointer on the screen.

Modification 2

In modification 2, the processing contents described in the above embodiments may be implemented by an information processing device, in which at least a part of the configurations of the information processing device 22 and the operation target device 3 are integrated. For example, the head mounted display may include the processing unit 200 of the information processing device 22 and a display 151 of the operation target device 3, so that the pointer, in accordance with the motion of the head of the user, is superimposed on an image displayed on the display 151, and the above mentioned input operation is performed thereby.

Modification 3

In modification 3, the imaging sensor 160 is used as a sensor that can measure the motion of the predetermined body part of the user. In the case of modification 3, the operation target device 3 is the above mentioned information processing device, and the CPU 110 includes the processing unit 200. For example, motion of a body part (e.g., head) of the user is imaged in live view mode or the like of the imaging sensor 160, and the processing unit 200 acquires the data related to the motion of the predetermined body part recognized by image recognition. The rest of the processing steps are the same as those of the above embodiments. Thereby using a personal computer or the like, which includes a camera, operation intended by the user can be appropriately implemented by inclusions of the above mentioned non-moving mode, whereby usability can be improved.

Modification 4

In the embodiments described above, the information processing device 22 sends the UI auxiliary signal to the operation target device 3, and the setting of the operation mode (restricting mode, moving mode or pressing mode) is displayed on the operation target device 3, but the present invention is not limited to this example. The processing unit 200 of the information processing device 22 may send the UI auxiliary signal to the display unit 220. In this case, the display unit 220 may display the setting of the operation mode (restricting mode, moving mode or pressing mode) using the emitted color of an LED light, for example. According to this configuration, the user can more easily recognize the currently set operation mode.

Modification 5

The information processing device 22 may include a speaker, and when a pressing signal is sent to the operation target device 3, a sound corresponding to the type of this pressing signal, may be outputted from the speaker. According to this configuration, the user can understand the execution of the pressing operation via a sound as well.

Modification 6

The information processing device 22 may be configured to be detachable from the frame 20 of the eyewear device 2. The structure to make the information processing device 22 to be detachable from the frame 20 is not limited. For example, the information processing device 22 may be attached to the frame 20 by holding the temple of the frame 20 using a clip disposed on the casing of the information processing device 22, or by using a mounting hole formed to insert the temple. For another example, the information processing device 22 may be magnetically attached to the frame 20 by magnetic bonding. For another example, the information processing device 22 may be adhered to the frame 20 using an adhesive, tape or the like. For another example, the information processing device 22 may include a band, and is mounted on the frame 20 by this band wound around the frame 20.

Modification 7

The information processing device 22 may further include a bioelectrode. The bioelectrode may be disposed on the information processing device 22 so as to contact the surface of the skin of the user when the user wears the eyewear device 2. The bioelectrode may be electrically connected to the processing unit 200 via an amplifying unit, for example. The acquiring unit 202 may acquire an ocular potential signal received from the bioelectrode. The output unit 208 may output an ocular potential signal received from the bioelectrode when necessary. For example, the bioelectrode is used to detect whether or not the user is wearing the eyewear device 2. For another example, the bioelectrode is used to measure the activity amount of the user or an area around the eyes.

What is claimed is:

1. A device for operating an operation target device including a display screen, the device comprising a processor, wherein the processor executes:

acquiring motion information on motion of a predetermined body part of a user from a sensor mounted on the body part;

controlling a pointer displayed on a display screen, based on an operation mode, which is set to one of (1) a moving mode in which a moving signal relating to moving, over the display screen, the pointer displayed on the display screen is transmittable to the operation target device, based on the motion information, (2) a restricting mode in which movement of the pointer on the display screen is restricted, and (3) a pressing mode in which a pressing signal relating to executing a pressing operation at a position of the pointer on the display screen is transmittable to the operation target device, based on a part of the motion information;

setting the operation mode to the pressing mode; and after setting the operation mode to the pressing mode, setting the operation mode after the pressing operation, to either the moving mode or the restricting mode, based on whether or not the motion information on a first motion to send the pressing signal and the motion information on a second motion after the first motion, out of the motion information acquired in the pressing mode, satisfies a first condition relative to the motion of the predetermined body part.

2. The device according to claim 1, wherein the processor further sets the operation mode to the pressing mode after setting the operation mode to the moving mode, based on a case where the motion information acquired in the moving mode satisfies a second condition relative to the motion of the predetermined body part.

3. The device according to claim 2, wherein the processor further sets the operation mode to the moving mode after setting the operation mode to the restricting mode, based on a case where the motion information acquired in the restricting mode satisfies a third condition relative to the motion of the predetermined body part.

4. The device according to claim 2, wherein based on a case where the operation mode is set to the pressing mode, the processor further sends information to display, on the display screen, information related to an operation method in the pressing mode.

5. The device according to claim 1, wherein the processor further sends information to output information on at least one of: whether or not the operation mode has been set to the moving mode; whether or not the operation mode has been set to the restricting mode; and whether or not the operation mode has been set to the pressing mode, to at least one of the display screen and an output device included in the device.

6. The device according to claim 1, wherein the first condition includes conditions indicating that:

the motion information on the first motion includes information indicating that the predetermined body part has moved in a first direction; and the motion information on the second motion includes information indicating that the predetermined body part has moved in a second direction, and in a case where determination is made that the motion information satisfies the first condition, the processor sets the operation mode to the moving mode.

7. The device according to claim 6, wherein the second direction is an opposite direction to the first direction.

8. The device according to claim 1, further comprising an interface which is wire connected with the operation target device, wherein the moving signal and the pressing signal are sent through the interface.

9. The device according to claim 8, wherein power is supplied from the operation target device through the interface.

10. The device according to claim 1, comprising a main body which is configured to be mountable on a head, wherein the processor and the sensor are disposed in the main body.

11. An information processing method executed by a processor of a device for operating an operation target device including a display screen, the method comprising steps of:

acquiring motion information on motion of a predetermined body part of a user from a sensor mounted on the body part;

controlling a pointer displayed on a display screen, based on an operation mode, which is set to one of (1) a moving mode in which a moving signal relating to moving, over the display screen, the pointer displayed on the display screen is transmittable to the operation target device, based on the motion information, (2) a restricting mode in which movement of the pointer on the display screen is restricted, and (3) a pressing mode in which a pressing signal relating to executing a pressing operation at a position of the pointer on the display screen is transmittable to the operation target device, based on the motion information;

setting the operation mode to the pressing mode; and after setting the operation mode to the pressing mode, setting the operation mode after the pressing operation, to either the moving mode or the restricting mode, based on whether or not the motion information on a first motion to send the pressing signal and the motion information on a second motion after the first motion, out of the motion information acquired in the pressing mode, satisfy a first condition relative to the motion of the predetermined body part.

12. A non-transitory computer program product for causing a processor, of a device for operating an operation target device including a display screen, to perform a method for:

acquiring motion information on motion of a predetermined body part of a user from a sensor mounted on the body part;

controlling a pointer displayed on a display screen, based on an operation mode, which is set to one of (1) a moving mode in which a moving signal relating to moving, over the display screen, the pointer displayed on the display screen is transmittable to the operation target device, based on the motion information, (2) a restricting mode in which movement of the pointer on the display screen is restricted, and (3) a pressing mode in which a pressing signal relating to executing a pressing operation at a position of the pointer on the display screen is transmittable to the operation target device, based on the motion information;

setting the operation mode to the pressing mode; and after setting the operation mode to the pressing mode, setting the operation mode after the pressing operation, to either the moving mode or the restricting mode, based on whether or not the motion information on a first motion to send the pressing signal and the motion information on a second motion after the first motion, out of the motion information acquired in the pressing mode, satisfies a first condition relative to the motion of the predetermined body part.

* * * * *